(12) United States Patent
Lotter

(10) Patent No.: US 12,185,272 B2
(45) Date of Patent: *Dec. 31, 2024

(54) INTEGRATED SYSTEM FOR COMMUNICATION AND SENSING FOR DISTRIBUTED ANTENNA SYSTEMS

(71) Applicant: Nextivity, Inc., San Diego, CA (US)

(72) Inventor: Michiel Petrus Lotter, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,529

(22) Filed: Sep. 27, 2023

(65) Prior Publication Data
US 2024/0023057 A1  Jan. 18, 2024

Related U.S. Application Data

(63) Continuation of application No. 17/328,981, filed on May 24, 2021, now Pat. No. 11,785,574, which is a continuation of application No. 16/442,383, filed on Jun. 14, 2019, now Pat. No. 11,019,593.

(60) Provisional application No. 62/684,983, filed on Jun. 14, 2018.

(51) Int. Cl.
H04W 64/00 (2009.01)
H04W 4/33 (2018.01)
H04W 4/38 (2018.01)
H04W 84/18 (2009.01)

(52) U.S. Cl.
CPC .......... *H04W 64/003* (2013.01); *H04W 4/33* (2018.02); *H04W 4/38* (2018.02); *H04W 84/18* (2013.01)

(58) Field of Classification Search
CPC ....... H04W 64/003; H04W 4/33; H04W 4/38; H04W 84/18; H04W 4/80
See application file for complete search history.

(56) References Cited

U.S. PATENT DOCUMENTS 10,163,329 B1 * 12/2018 Jensen ............. G08B 13/19678
11,019,593 B2 * 5/2021 Lotter ..................... H04W 4/38
(Continued)

FOREIGN PATENT DOCUMENTS

WO   WO-2017205723 A1 * 11/2017 ............... H04B 1/38
WO   2019204205 A1    10/2019

OTHER PUBLICATIONS

Extended European Search Report dated Feb. 4, 2022 for European Patent Application No. EP19820504.9, 8 pages.
(Continued)

*Primary Examiner* — Brandon J Miller
(74) *Attorney, Agent, or Firm* — FisherBroyles LLP; James P. Cleary

(57) ABSTRACT

A system and method for communicating and sensing for distributed antennas associated with a building. Each of a number of antennas distributed geographically within the building include one or more sensors, each of the one or more sensors being configured to sense an environmental condition associated with the building and generate sensor data. A sensor processor is configured to receive the sensor data and generate a digital map view of a portion of the building based on locations of the plurality of antennas, the map view including a digital representation of the sensor data.

4 Claims, 3 Drawing Sheets

(56) References Cited

U.S. PATENT DOCUMENTS

| | | | |
|---|---|---|---|
| 11,785,574 B2* | 10/2023 | Lotter | H04W 64/003 |
| | | | 455/456.3 |
| 2003/0234725 A1 | 12/2003 | Lemelson et al. | |
| 2006/0125630 A1 | 6/2006 | Parkulo | |
| 2007/0096901 A1 | 5/2007 | Seeley et al. | |
| 2007/0103292 A1 | 5/2007 | Burkley et al. | |
| 2010/0280796 A1* | 11/2010 | Ramin | H05K 7/20836 |
| | | | 702/188 |
| 2010/0280836 A1 | 11/2010 | Lu et al. | |
| 2013/0053063 A1 | 2/2013 | Mcsheffrey | |
| 2013/0109406 A1 | 5/2013 | Meador et al. | |
| 2013/0147627 A1 | 6/2013 | Svenning | |
| 2013/0151979 A1* | 6/2013 | Snider | G06F 3/0484 |
| | | | 715/738 |
| 2013/0157559 A1 | 6/2013 | Flammer, III et al. | |
| 2013/0162534 A1* | 6/2013 | Chen | G06F 3/0346 |
| | | | 345/158 |
| 2013/0268127 A1 | 10/2013 | Casilli et al. | |
| 2014/0278060 A1 | 9/2014 | Kordari et al. | |
| 2015/0046582 A1 | 2/2015 | Gelvin et al. | |
| 2015/0091757 A1 | 4/2015 | Shaw et al. | |
| 2015/0365246 A1 | 12/2015 | Kane | |
| 2016/0119424 A1 | 4/2016 | Kane et al. | |
| 2016/0180663 A1 | 6/2016 | McMahan et al. | |
| 2016/0210790 A1 | 7/2016 | Rasane et al. | |
| 2016/0286363 A1 | 9/2016 | Vincent et al. | |
| 2016/0295495 A1 | 10/2016 | Lotter et al. | |
| 2016/0298969 A1 | 10/2016 | Glenn, III et al. | |
| 2017/0264604 A1 | 9/2017 | Drako et al. | |
| 2017/0311131 A1 | 10/2017 | South et al. | |
| 2018/0054713 A1 | 2/2018 | South et al. | |
| 2018/0139517 A1* | 5/2018 | Schwartz | F24F 11/56 |
| 2018/0356241 A1 | 12/2018 | Correnti et al. | |
| 2019/0096232 A1 | 3/2019 | Wedig et al. | |
| 2019/0149664 A1* | 5/2019 | Wojtunik | H04B 10/079 |
| | | | 379/102.01 |
| 2019/0174208 A1 | 6/2019 | Speicher et al. | |
| 2019/0295207 A1 | 9/2019 | Day et al. | |
| 2019/0295386 A1 | 9/2019 | Roberts | |
| 2019/0370805 A1 | 12/2019 | Van Os et al. | |
| 2019/0372650 A1 | 12/2019 | Takii et al. | |
| 2020/0100246 A1 | 3/2020 | Stefanik et al. | |
| 2020/0274626 A1 | 8/2020 | Leaf et al. | |
| 2020/0334470 A1 | 10/2020 | Abeykoon et al. | |
| 2020/0334778 A1 | 10/2020 | Lotter | |

OTHER PUBLICATIONS

International Searching Authority; International Preliminary Report on Patentability dated Dec. 24, 2020 for International Application No. PCT/US2019/037381, 6 pages. (2020).

International Searching Authority; International Search Report and Written Opinion dated Aug. 30, 2019 for International Application No. PCT/US2019/037381, 7 pages. (2019).

International Searching Authority; International Search Report and Written Opinion dated Dec. 8, 2022 for International Application No. PCT/US2022/037681, 9 pages. (2022).

International Searching Authority; International Search Report and Written Opinion; Application No. PCT/US2020/029025, Mailed On Jul. 17, 2020, 8 pages. (2009).

International Searching Authority; Application No. PCT/US2022/011167, International Search Report and Written Opinion, Mailed On Mar. 28, 2022,9 pages. (2022).

Holmberg et al., "Delivering Building Intelligence to First Responders", NIST Technical Note 1648, Available Online At: http://dx.doi.org/10.6028/NIST.TN.1648, Feb. 2013, pp. 1-20.

* cited by examiner

INTEGRATED SYSTEM FOR COMMUNICATION AND SENSING FOR DISTRIBUTED ANTENNA SYSTEMS

CROSS-REFERENCES TO RELATED APPLICATIONS

This application is a continuation of U.S. application Ser. No. 17/328,981, entitled "INTEGRATED SYSTEM FOR COMMUNICATION AND SENSING FOR DISTRUSTED ANTENNA SYSTEMS," and filed on May 24, 2021, which is a continuation of U.S. application Ser. No. 16/442,383 entitled "INTEGRATED SYSTEM FOR COMMUNICATION AND SENSING FOR DISTRIBUTED ANTENNA SYSTEMS," (now U.S. Pat. No. 11,019,593), and filed on Jun. 14, 2019, which claims priority to U.S. Provisional Application No. 62/684,983 filed on Jun. 14, 2018, the entirety of each which are hereby incorporated by reference herein.

TECHNICAL FIELD

The subject matter described herein relates to communication and sensing, and more particularly to an integrated system for communication and sensing for a distributed antenna system.

BACKGROUND

Many buildings today include systems that enhance wireless communications within the building. These systems could be radio frequency (RF) repeater-type systems, Distributed Antenna Systems (DAS), small cells and other solutions. The types of wireless signals that may be enhanced using these types of systems include cellular systems, Wi-Fi systems and Public Safety systems. In particular, Public Safety systems are being deployed more frequently as fire code requirements become increasingly more stringent.

In addition to enhancement systems for wireless communications, there is also rapid growth in so-called smart buildings. A smart building is any structure that uses automated processes to automatically control the building's operations including heating, ventilation, air conditioning, lighting, security and other systems. A smart building uses sensors, actuators and microchips, in order to collect data and manage it according to a business' functions and services. This infrastructure helps owners, operators and facility managers improve asset reliability and performance, which reduces energy use, optimizes how space is used and minimizes the environmental impact of buildings.

This level of automation coupled with the requirements for wireless enhancement systems leads to extremely complex in-building systems to connect all of the devices together. Various techniques have been considered to minimize this complexity including, wireless mesh networking techniques such as ZigBee and Bluetooth Low Energy (BLE), as well as wired techniques such as Power Line Communications (PLC). However, systems to reduce the complexity of building automation and systems improving RF signal quality in a building have typically not been integrated.

SUMMARY

This document presents an-building integrated communication and sensing system and method that generates a map view of a building based on a distributed antenna system located therein, and shows sensor data of one or more sensors associated with each antenna. The sensors sense a condition or environment associated with the building. These systems and methods reduce the complexity of smart building systems, among other features.

In one aspect, a system for communicating and sensing for distributed antennas associated with a building includes a plurality of antennas distributed geographically within the building. Each of the plurality of antennas includes one or more sensors. Each of the one or more sensors is configured to sense an environmental condition associated with the building and generate sensor data. Each of the plurality of antennas further includes a communication module to transmit the sensor data. The system further includes a signal distribution network configured to communicate the sensor associated with each of the plurality of antennas from the communication module. The system further includes a sensor processor configured to receive the sensor data and generate a digital map view of a portion of the building based on locations of the plurality of antennas, the map view including a digital representation of the sensor data.

In some other aspects, a method for communicating and sensing for distributed antennas associated with a building includes the step of sensing, by one or more sensors associated with each of a plurality of antennas distributed geographically within the building, an environmental condition associated with the building and generate sensor data. The method further includes transmitting, by a communication module of each of the plurality of antennas, the sensor data to a signal distribution network, and receiving, by a sensor processor associated with the plurality of antennas, the sensor data from the signal distribution network. The method further includes generating, by the sensor processor, a digital map view of a portion of the building based on locations of the plurality of antennas, the map view including a digital representation of the sensor data.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
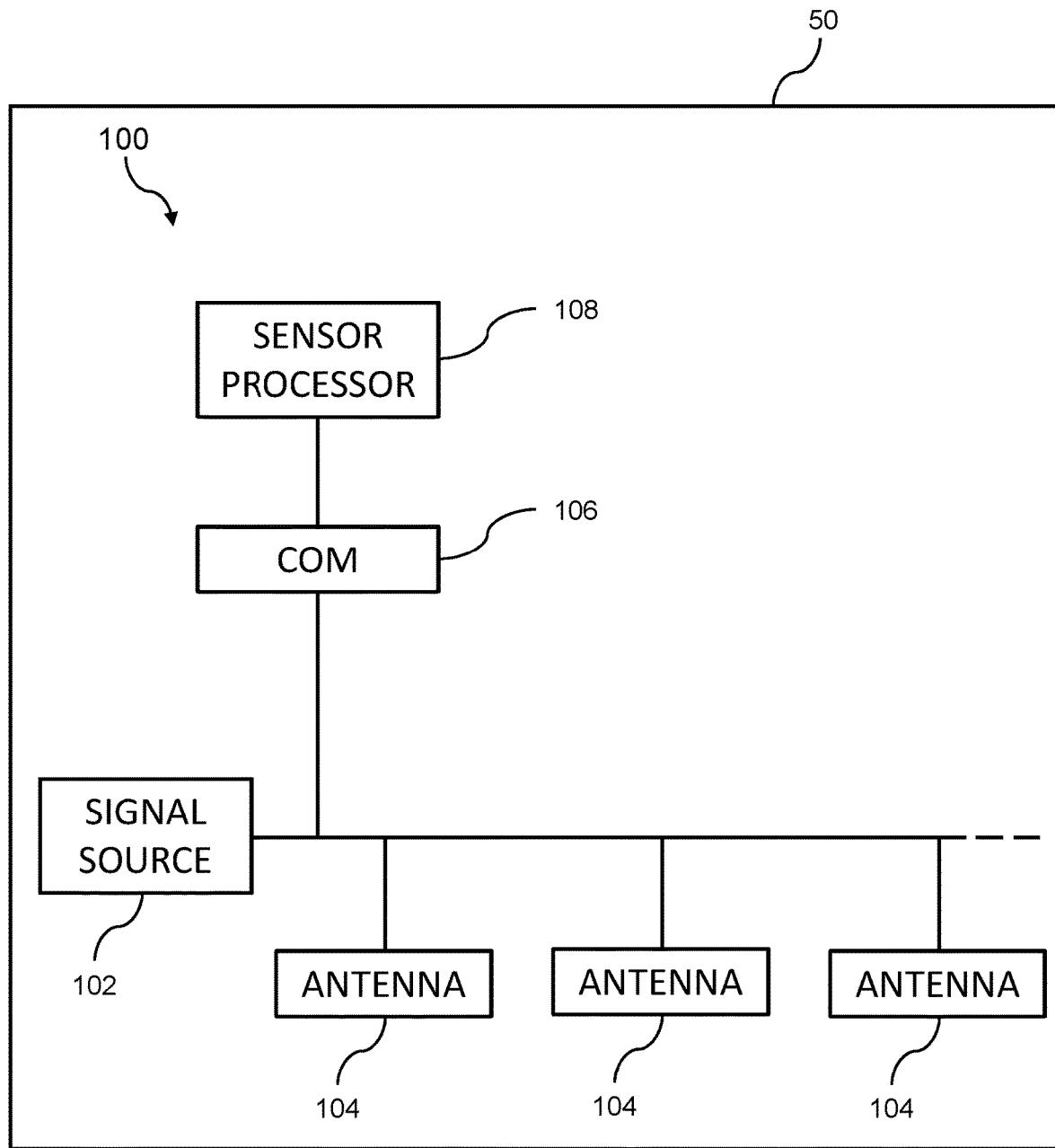
FIG. 1 shows a system consistent with implementations of the current subject matter.

In accordance with some implementations, a system 100 is shown in FIG. 1. The system 100 includes one or more smart antennas 104 connected to one or more signal sources 102 through a common physical communication medium such as a coaxial cable or a fiber optic cable. The system 100 further includes a sensor processor 108 connected with signal source 102 and the smart antennas 104 via the communication medium.

Figure 2:
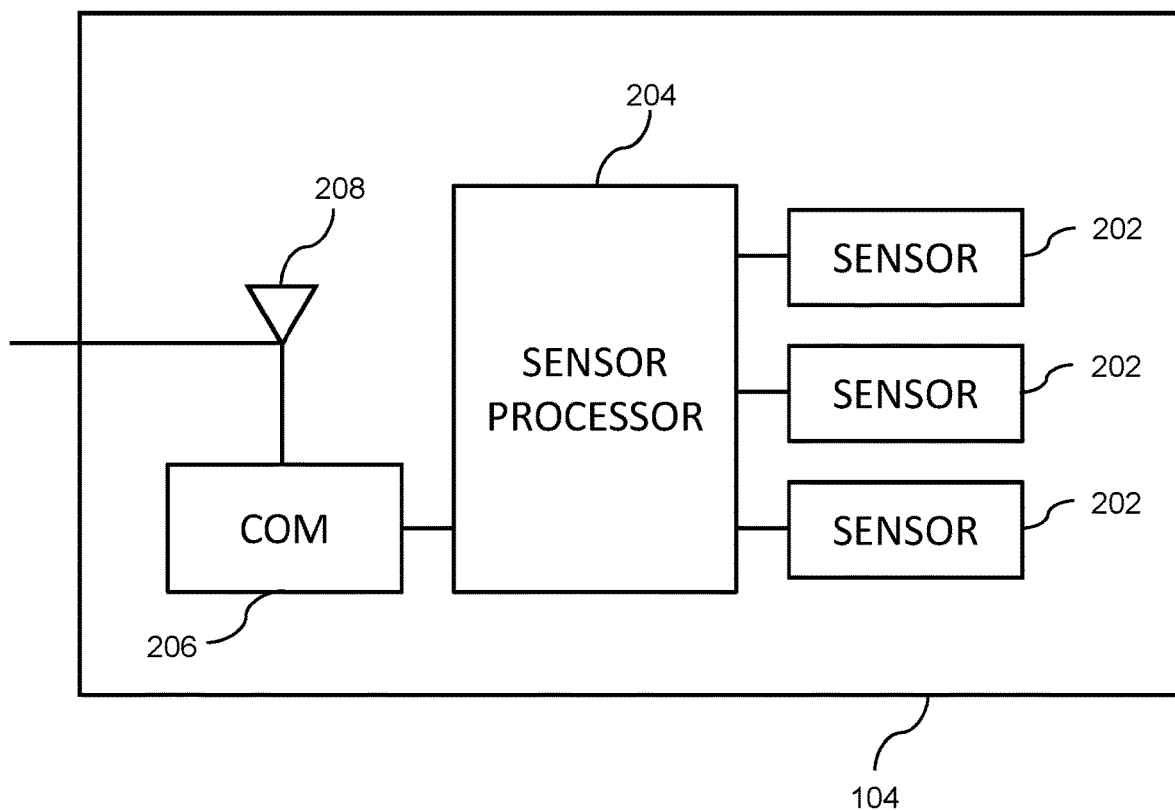
FIG. 2 shows a smart antenna of a distributed antenna system, consistent with implementations of the current subject matter.

As shown in FIG. 2, one or more of the smart antennas 104, and preferably all of the smart antennas of the system 100, include one or more sensors 202 for sensing a local environment, activity, or feature to produce sensor data, which can be received and processed by sensor processor 108 or local sensor processor 204. The sensor data can also be sent to one or more destinations using the shared common physical communication medium, or signal distribution network, as well as one or more antennas 208 or smart antennas 104 that may radiate the communication signals from the one or more signal sources 102.

In some implementations, the communication medium is a RF mesh network such as ZigBee or BLE. The sensors 202 include capabilities to sense environmental conditions that may be of interest to building occupants like first responders, such as firefighters. These conditions may include, without limitation, carbon monoxide concentration, temperature, air quality, ground or building movement, and the like.

In some preferred exemplary implementations, the system is configured to generate a digitally-produced map view of a building or floor that indicates a position of each antenna, and shows the sensor readings associated with each antenna. In some implementations, a user interface is provided to allow a user to select or indicate which sensor readings should be shown. In yet other implementations, the system 100 is configured to only show sensor readings that exceed a predefined threshold, in time units or in quantifiable units. Such a map view may be locally accessible at the system 100 or remotely via, for example, a web interface via signal source 102.

Figure 3:
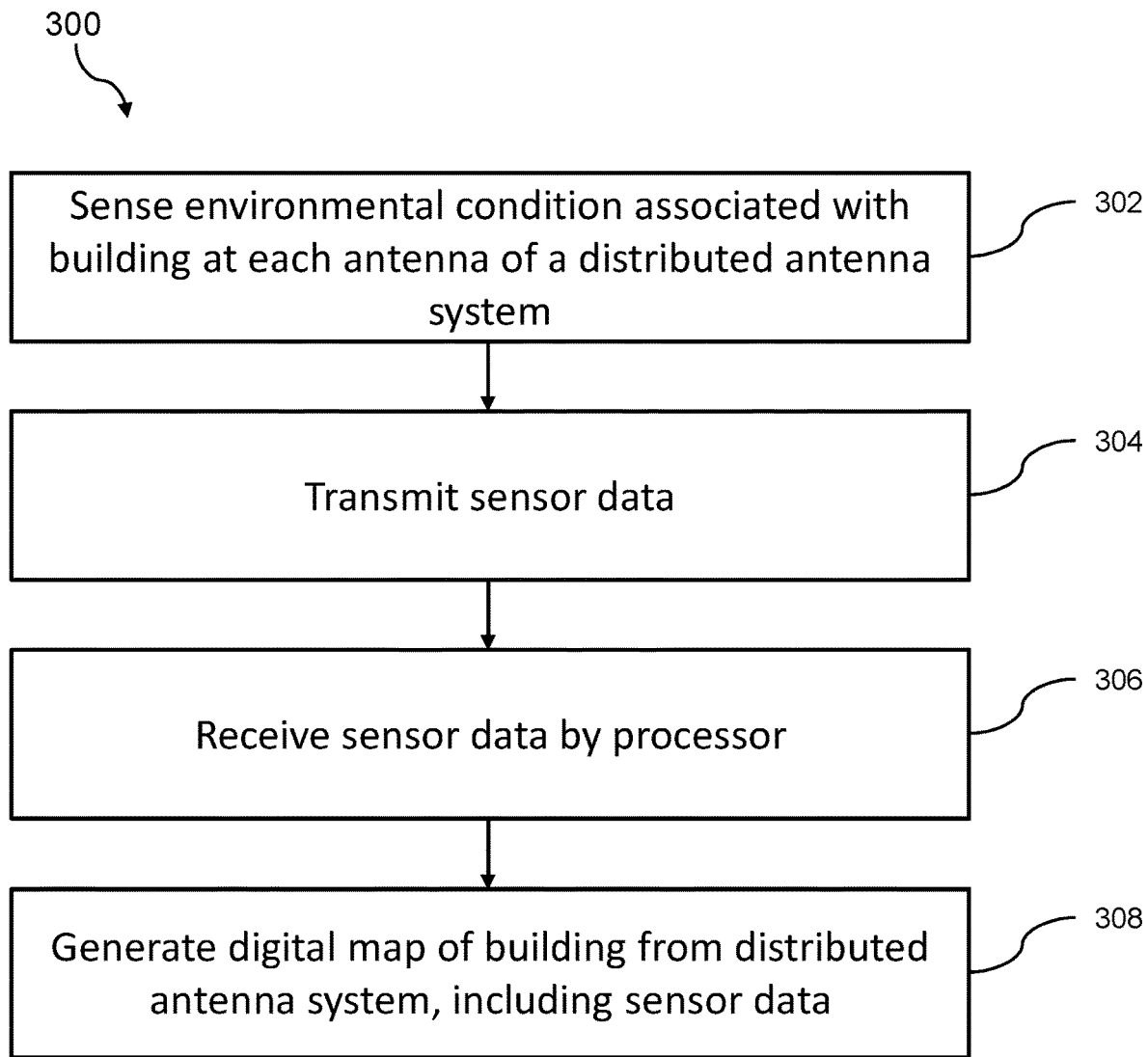
FIG. 3 is a flowchart of a method of determining a position of a first responder in a building, where the first responder is using a radio.

FIG. 3 is a flowchart illustrating a method 300 of communicating and sensing for distributed antennas associated with a building. At 302, one or more sensors associated with each of a plurality of antennas distributed geographically within the building sense an environmental condition associated with the building and generate sensor data. At 304, a communication module of each of the plurality of antennas transmits the sensor data to a signal distribution network. At 306, a sensor processor associated with the plurality of antennas receives the sensor data from the signal distribution network. At 308, the sensor processor generates a digital map view of a portion of the building based on locations of the plurality of antennas, the map view including a digital representation of the sensor data.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for sensing and communicating a condition within a building, the system comprising:
 a plurality of antennas distributed within the building, each of the plurality of antennas having one or more sensors, each of the one or more sensors being configured to sense a condition within the building and generate sensor data, each of the plurality of antennas further having a local sensor processor configured to process the sensor data and a communication module to transmit the sensor data;
 a central sensor processor configured to receive the sensor data from the local sensor processor or the communication module of each of the plurality of antennas, and generate a digital map view of at least a portion of the building based on a location in the building of each of the plurality of antennas, the digital map view including a digital representation of the sensor data;
 a signal distribution network comprising a common physical communication medium shared by the plurality of antennas and a radio frequency mesh network between the plurality of antennas and the central sensor processor, the signal distribution network being configured to communicate the sensor data and map view associated with each of the plurality of antennas and its associated one or more sensors from the communication module; and
 a user interface configured to receive the sensor data and/or digital map view from the common physical communication medium or the radio frequency mesh network and display the digital map view of the portion of the building, the user interface being configurable to display selected sensor data in the portion of the building.

2. The system in accordance with claim 1, wherein the central sensor processor is connected with each of the plurality of antennas via the signal distribution network.

3. The system in accordance with claim 1, wherein the selected sensor data is based on a user selection received by the user interface.

4. The system in accordance with claim 1, wherein the condition is associated with a public safety and security system of the building.

* * * * *